United States Patent
Lee et al.

(10) Patent No.: US 7,708,448 B2
(45) Date of Patent: May 4, 2010

(54) ALL-IN-ONE TYPE LIGHT GUIDE PLATE AND BACKLIGHT APPARATUS EMPLOYING THE SAME

(75) Inventors: Hong-seok Lee, Seongnam-si (KR); Hoon Song, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 23 days.

(21) Appl. No.: 12/061,722

(22) Filed: Apr. 3, 2008

(65) Prior Publication Data

US 2009/0091949 A1    Apr. 9, 2009

(30) Foreign Application Priority Data

Oct. 4, 2007    (KR) ...................... 10-2007-0099936

(51) Int. Cl.
*F21V 7/04* (2006.01)
(52) U.S. Cl. ...................... 362/620; 362/628
(58) Field of Classification Search ................. 362/620, 362/628
See application file for complete search history.

(56) References Cited

U.S. PATENT DOCUMENTS

| | | | |
|---|---|---|---|
| 6,049,649 A | | 4/2000 | Arai |
| 6,129,439 A | * | 10/2000 | Hou et al. .................. 362/620 |
| 2002/0039287 A1 | | 4/2002 | Ohkawa |
| 2004/0090765 A1 | * | 5/2004 | Yu et al. ...................... 362/31 |
| 2005/0270798 A1 | | 12/2005 | Lee et al. |
| 2006/0291252 A1 | * | 12/2006 | Lim et al. .................. 362/628 |
| 2009/0067151 A1 | * | 3/2009 | Sahlin et al. ................ 362/23 |

FOREIGN PATENT DOCUMENTS

WO    97/41471 A1    11/1997

* cited by examiner

*Primary Examiner*—David V Bruce
(74) *Attorney, Agent, or Firm*—Sughrue Mion, PLLC

(57) ABSTRACT

An all-in-one light guide plate, a backlight apparatus employing the same, and a method of manufacturing the all-in-one light guide plate are provided. The all-in-one light guide plate has a structure in which a plurality of protrusion type refractive elements for outputting light are integrated into the light guide member. It is possible to improve optical properties by more densely arranging the refractive elements with distance from the light source.

20 Claims, 5 Drawing Sheets

(A)   (B)   (C)   (D)   (E)

(A)   (B)   (C)   (D)   (E)

ALL-IN-ONE TYPE LIGHT GUIDE PLATE AND BACKLIGHT APPARATUS EMPLOYING THE SAME

CROSS-REFERENCE TO RELATED PATENT APPLICATIONS

This application claims priority from Korean Patent Application No. 10-2007-0099936, filed on Oct. 4, 2007, and all the benefits accruing therefrom under 35 U.S.C. § 119, the contents of which are incorporated herein by reference in their entirety.

BACKGROUND OF THE INVENTION

1. Field of the Invention

Apparatuses and methods consistent with the present invention relate to an all-in-one type light guide plate and a backlight apparatus employing the same.

2. Description of the Related Art

In general, backlight apparatuses serve to illuminate a flat display device such as a liquid crystal display device. The backlight apparatuses are mainly classified as direct light type backlight apparatuses or light guide type backlight apparatuses. The light guide type backlight apparatuses are classified as flat type backlight apparatuses or wedge type backlight apparatuses.

In the direct light type backlight apparatuses, a light source is located at the back of a light output surface, thus enabling a planar lighting. It is possible to increase brightness by arranging a plurality of light sources as compared with the light guide type backlight apparatuses. In addition, it is possible to widen an area to be illuminated. However, power consumption is also increased. In a case where the direct light type backlight apparatuses are thin, it is difficult to sufficiently diffuse light. Accordingly, a shape of a lamp is projected onto a display screen. Uniformity of brightness is considerably decreased.

The light guide type backlight apparatuses have a structure in which light is incident onto an edge of a light guide plate and output to a light output surface of a light guide plate perpendicular to the incident light. Since the light source is located at the edge or side surface of the light guide plate, the number of light sources is limited due to a length of the side surface of the light guide plate. However, it is easy to make the light guide type backlight apparatuses thin. A structure for uniformly distribute brightness over the entire light emitting surface is complex as compared with the direct light type backlight apparatuses.

The flat type backlight apparatuses are employed for monitors or a case where high brightness is required. In the flat type backlight apparatuses, light sources may be fixed to four edges of a light guide plate. In order to increase brightness by arranging a plurality of light sources, a thickness of side surfaces of the light guide plate has to be uniform.

The wedge type backlight apparatuses are employed for devices which does not use a plurality of light sources because power consumption is limited. In the wedge type backlight apparatuses, a surface of a side of a light guide plate onto which light is incident from a light source has a large width, and other surfaces of the light guide plate have a small width. Accordingly, it is possible to reduce weight of backlight apparatuses.

Light sources used for the light guide type backlight apparatuses are classified as linear or filamentary light sources or point light sources. The linear or filamentary light sources are cold cathode fluorescent lamps (CCFLs) with a structure in which electrodes of both ends are located in a tube. The point light sources are light emitting diodes (LEDs). The CCFLs can emit intensive white light. It is possible to obtain high brightness and uniformity and to design backlight apparatuses so as to illuminate a large area. The CCFLs operate by using high frequency alternating current (AC) signals and have a narrow range of operating temperature. The LEDs have lower performance in brightness and uniformity than the CCFLs. However, the LEDs operate by using direct current (DC) signals. The LEDs have a long lifetime and a wide range of operating temperature. In addition, it is possible to make backlight apparatuses thin.

SUMMARY OF THE INVENTION

An exemplary embodiment of the present invention provides an all-in-one light guide plate capable of improving uniformity of light distribution by integrating protrusion type refractive elements into a light guide member and a backlight apparatus employing the same.

According to an exemplary embodiment of the present invention, there is provided an all-in-one light guide plate in which a plurality of protrusion type refractive elements are integrated into a light guide member in a form of an inverted prism for outputting light by internally and totally reflecting the light that is incident from a light source.

According to another exemplary embodiment of the present invention, there is provided an all-in-one light guide plate comprising: a light guide member internally reflecting light that is incident from a light source; and a plurality of refractive elements protrudedly formed on a side of the light guide member, the plurality of refractive elements having an upper width of a cross section through which light is output, which is greater than a lower width. The plurality of refractive elements of a light output structure are distributed more densely, as the plurality of refractive elements become distant from the light source.

In the above embodiment of the present invention, there might be no optical and physical boundary between the light guide member and the plurality of refractive elements.

In addition, sizes of the plurality of refractive elements may be increased, as the plurality of refractive elements becomes distant from the light source. In addition, the plurality of refractive elements may have an asymmetric structure in which a length in a light incident direction is less than a length in a direction perpendicular to the light incident direction. The plurality of refractive elements may become long in the light incident direction.

In addition, side surfaces of the plurality of refractive elements may be planar or curved surfaces. Upper surfaces of the plurality of refractive elements may have a shape of a rectangle, a circle, an oval, or a curved shape or a shape obtained by combining two or more among a rectangle, a circle, an oval, and a curved shape.

In addition, the plurality of refractive elements may have a shape that is bent toward a direction.

In addition, the plurality of refractive elements may be formed on a side of the light guide member and another side opposite to the side. Positions of refractive elements formed on the side may be dislocated from positions of refractive elements formed on the opposite side.

In addition, the plurality of refractive elements may be formed on an entire surface of a side of the light guide member and formed on a part of a surface of the opposite side.

In addition, the light guide member and the plurality of refractive elements may be made of an elastic material.

In addition, the elastic material may be polydimethylsiloxane.

According to still another exemplary embodiment of the present invention, there is provided a backlight apparatus comprising: a light source; a light guide member internally reflecting light incident from a light source; and a plurality of refractive elements protrudedly formed on a side of the light guide member, the plurality of refractive elements having an upper width of a cross section through which light is transmitted, which is greater than a lower width, and being distributed densely, as the plurality of refractive elements become distant from the light source.

In the above embodiment of the present invention, the backlight apparatus may be formed by laminating two or more light guide members.

In the backlight apparatus, when the two or more light guide members are laminated, positions of refractive elements on an upper light guide member may be dislocated from positions of refractive element on a lower light guide member.

In the light guide member used for the backlight apparatus, refractive elements may be further formed on a side and the opposite side corresponding to the side.

In addition, the backlight apparatus may further comprise a reflective plate at a side of the light guide member opposite to a side onto which light from the light source is incident.

In addition, the backlight apparatus may further comprise a reflective plate at a side of the light guide member, so that light incident from the light source is output in a direction.

BRIEF DESCRIPTION OF THE DRAWINGS

The above and other exemplary aspects and advantages of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
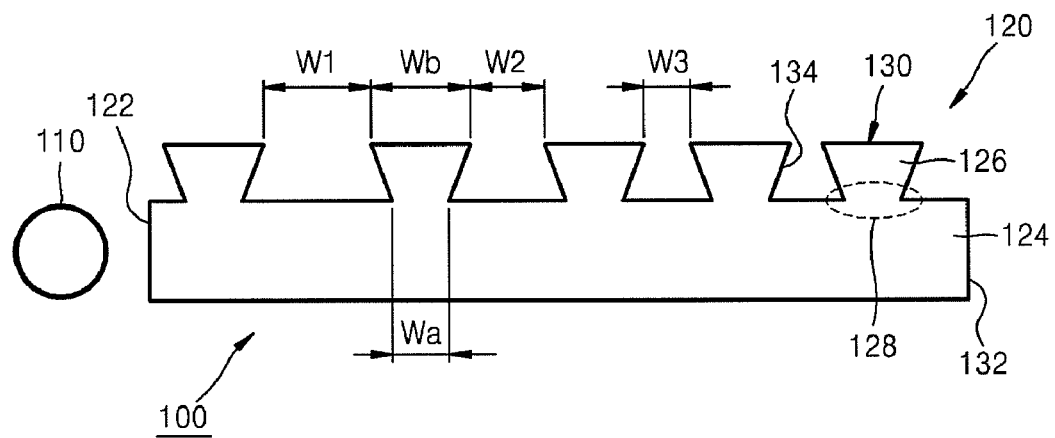
FIG. 1 is a cross-sectional view illustrating a backlight apparatus employing an all-in-one type light guide plate according to an exemplary embodiment of the present invention.

Exemplary embodiments of the invention is described more fully hereinafter with reference to the accompanying drawings, in which embodiments of the invention are shown. This should not be construed as limiting the claims to the embodiments shown. Rather, these embodiments are provided to convey the scope of the invention to those skilled in the art. In the drawings, the size and relative sizes of elements and regions may be exaggerated for clarity.

It will be understood that when an element or layer is referred to as being "on", "at", "interposed", "disposed", or "between" another element or layer, it can be directly on, at, interposed, disposed, or between the other element or layer or intervening elements or layers can be present.

The terms "first," "second," and the like, "primary," "secondary," and the like, as used herein do not denote any order, quantity, or importance, but rather are used to distinguish one element, region, component, layer, or section from another. The terms "front", "back", "bottom", and/or "top" are used herein, unless otherwise noted, merely for convenience of description, and are not limited to any one position or spatial orientation.

The terms "a" and "an" do not denote a limitation of quantity, but rather denote the presence of at least one of the referenced item. The suffix "(s)" as used herein is intended to include both the singular and the plural of the term that it modifies, thereby comprising one or more of that term (e.g., the layer(s) includes one or more layers).

Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

Figure 2:
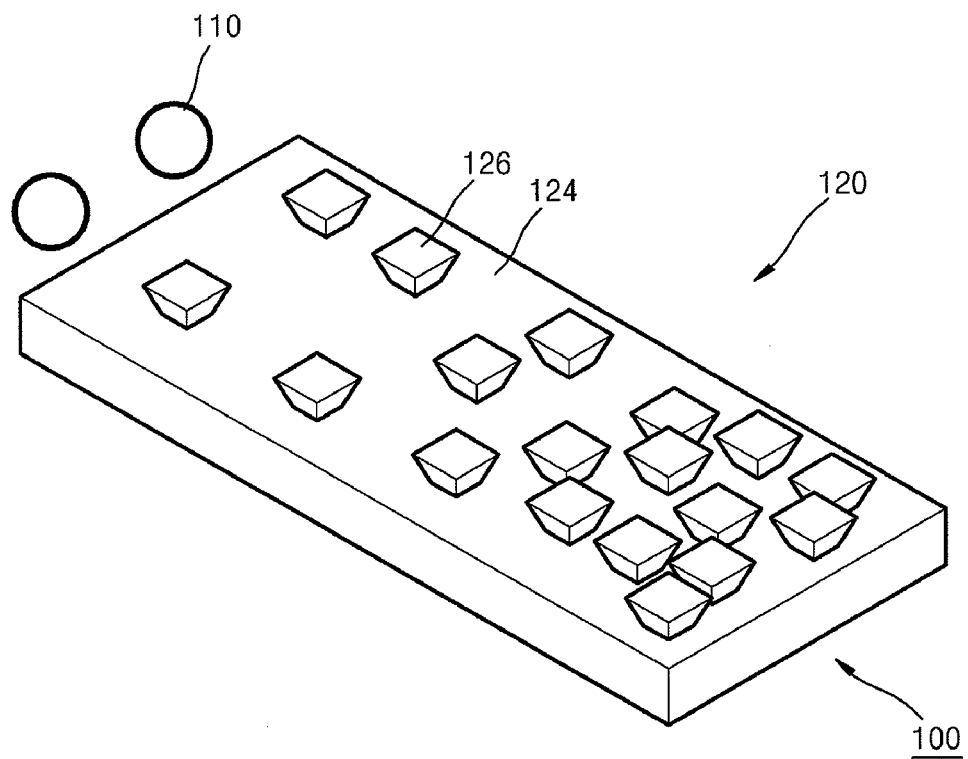
FIG. 2 is a schematic perspective view illustrating an all-in-one type light guide plate according to an exemplary embodiment of the present invention.

FIG. 1 is a cross-sectional view illustrating a backlight apparatus employing an all-in-one type light guide plate according to an exemplary embodiment of the present invention. FIG. 2 is a three-dimensional (3D) view illustrating an all-in-one type light guide plate according to an exemplary embodiment of the present invention.

Referring to FIG. 1, a backlight apparatus 100 includes a light source 110 for emitting light and an all-in-one type light guide plate 120.

The light source 110 is located at a side 122 of the all-in-one type light guide plate 120.

In the all-in-one type light guide plate 120, protrusion type refractive elements 126 of a light output structure for outputting light to the outside by internally reflecting light that is reflected from a light guide member 124 are integrated into an upper surface of the light guide member 124. In addition, the refractive elements 126 of the light output structure are distributed more densely, as the refractive elements become distant from the light source 110. That is, as shown in FIG. 1, if intervals between neighboring refractive elements 126 are W1, W2, and W3 in the ascending order of distances between the refractive elements and the light source 110, W1 is more than W2, and W2 is more than W3. The refractive elements 126 integrated into the light guide member 124 might have no physical and optical boundaries with the light guide member 124.

The refractive elements 126 integrated into the light guide member 124 may have an upper width Wb of a part through which light is output greater than a lower width Wa of a part through which light is incident. A method of forming the upper and lower widths Wb and Wa of the refractive elements 126 will be described later.

FIG. 2 is a 3D perspective view illustrating the all-in-one light guide plate 120 according to the embodiment. The refractive elements 126 are distributed more densely, as the refractive elements become distant from the light source 110.

Although a density of the refractive elements 126 may be different based on types and positions of light sources, in order to uniformly output light from the light guide plate, as shown in FIG. 1, a density of the refractive elements 126 located at a side (light incident side) near to the light source 110 may be adjusted to be lower than a density of the refractive elements 126 located at a side (light reflecting side) distant from the light source 110.

In addition to a method of adjusting a density of the refractive elements 126, lengths of the refractive elements 126 in a direction parallel to a light propagation direction with respect to the light incident side 122 and the light reflecting side 132 may be adjusted.

In addition, a method of increasing areas of lower parts 128 of the refractive elements 126 through which light is incident may be applicable.

Figure 3:
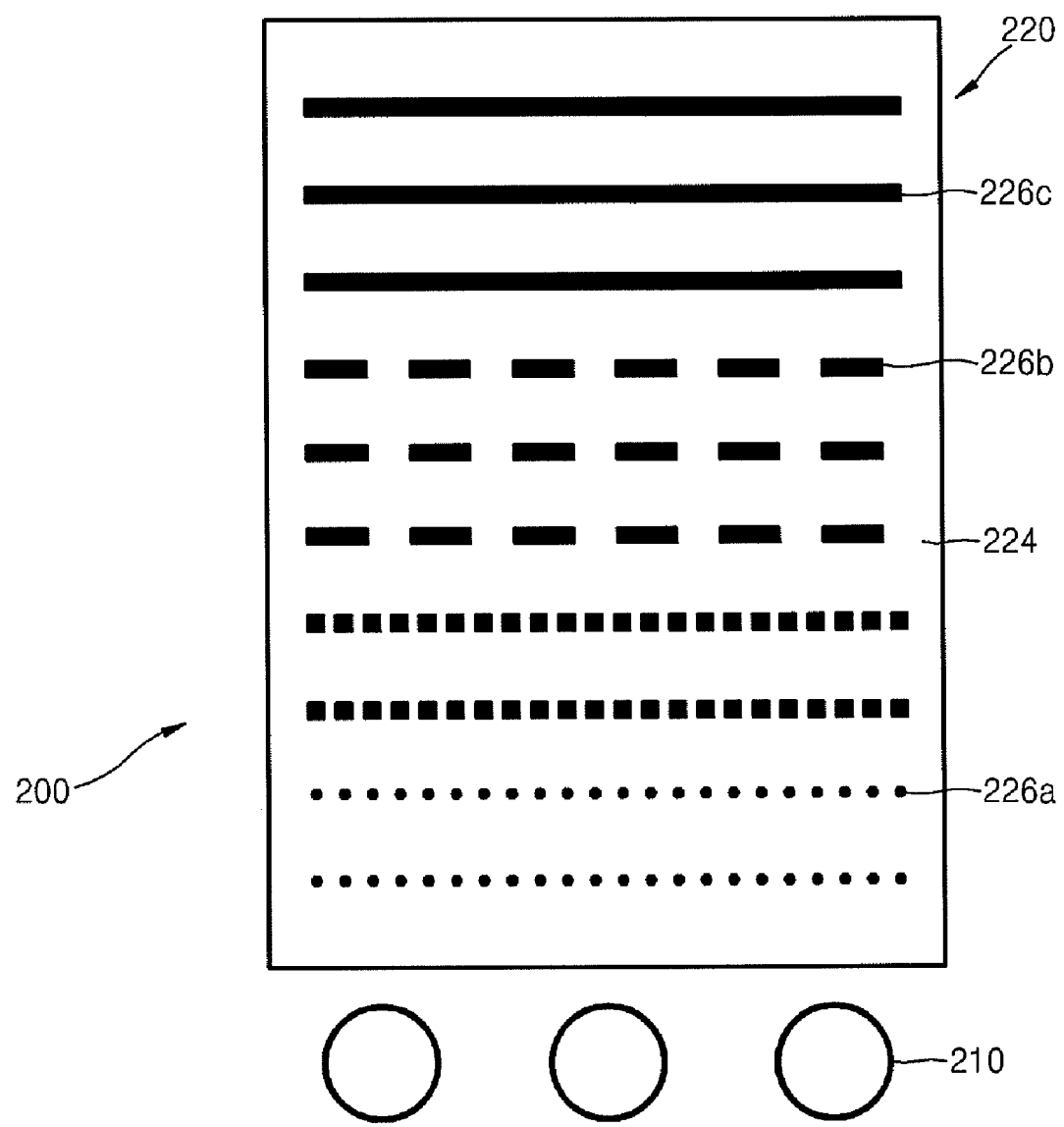
FIG. 3 is a top plan view illustrating an all-in-one type light guide plate in which sizes of refractive elements are changed, as the refractive elements become distant from a light source.
Figure 4:
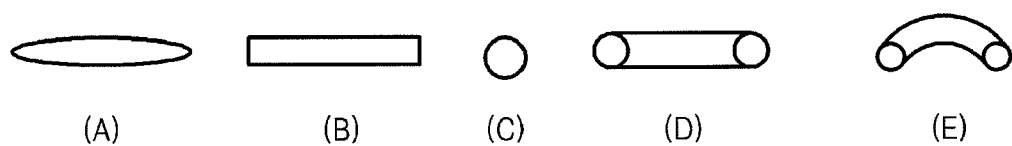
FIG. 4 illustrates an example of various refractive elements of an all-in-one light guide plate according to an exemplary embodiment of the present invention.

FIG. 3 is a top plan view illustrating an all-in-one type light guide plate 220 in which sizes of refractive elements are changed, as the refractive elements become distant from a light source.

In the all-in-one type light guide plate 220, refractive elements 226 of a light output structure for outputting light to the outside by internally reflecting light that is reflected from a light guide member 224 are integrated into an upper surface of the light guide member 224. In addition, the refractive elements 226a to 226c of the light output structure are distributed more densely, as the refractive elements become distant from the light source 210.

In addition, sizes of the refractive elements 226a to 226c of the all-in-one light guide plate 220 are increased, as the refractive elements become distant from the light source 210. That is, the refractive elements have an asymmetric structure in which a length in a light incident direction is less than a length in a direction perpendicular to the light incident direction. As shown in FIG. 3, the all-in-one light guide plate 220 according to an embodiment of the present invention includes refractive elements 226b longer than refractive elements 226a near the light source 210 in a direction perpendicular to a light incident direction in an intermediate region of the all-in-one light guide plate 220. The all-in-one light guide plate 220 according to an embodiment of the present invention includes a refractive element 226c longer than the refractive elements 226b located at the intermediate region in a direction perpendicular to the light incident direction in a region distant from the light source 210.

A shape of upper surfaces of the refractive elements of the all-in-one light guide plate 220, that is, surfaces (130 of FIG. 1) through which light is output is variously determined based on a type of the light source, desired angular distribution of output light, and a distance between the refractive elements and the light source 210.

For example, if a filamentary light source is used, as shown in FIGS. 4A to 4D, refractive elements may have a shape such as a rectangle, a circle, an oval, and a curved shape or a shape obtained by combining two among a rectangle, a circle, an oval, and a curved shape. In addition, as shown in FIG. 4E, refractive members may have a shape that is bent toward a direction.

If a point light source 210 such as a light emitting diode (LED) is employed as a light source, in order to obtain a circular angular distribution of output light, it is advantageous that upper surfaces of the refractive elements have a circular shape. However, in an application of front light in which an angular distribution of output light is not important, in order to increase an amount of output light, upper surfaces of the refractive elements may have a shape of a circle or an oval.

A method of using a filamentary light source so as to remove bright lines or dark parts of the light incident part employs a filamentary light source such as a cool cathode fluorescent lamp (CCFL) or a point light source by using a unit for converting the point light source such as an LED into a filamentary light source.

In a case where the point light source is used, a method of increasing the number of point light sources 210 or a method of locating the point light source 210 at a corner of the all-in-one light guide plate 220 may be applied. In a case where the point light source 210 is located at the corner, it is effective to adjust uniformity of light at a region near the light source 210 by using refractive elements having the bent shape of FIG. 4E.

Like the aforementioned case, it is possible to adjust uniformity of light by changing a length of refractive elements while maintaining the bent shape. That is, as the refractive elements are close to the light source, a length obtained by connecting the refractive elements is small, and an interval between neighboring elements is large in a direction perpendicular to the light incident direction. As the refractive elements are distant from the light source, a length obtained by connecting the refractive elements is large, and an interval between neighboring elements is small in the direction perpendicular to the light incident direction.

In a case where the point light source 210 is located at the corner of the all-in-one light guide plate 220, refractive elements having a circular shape may be used. Positions of the refractive elements are determined in a radial direction of the light source 210. In order to secure uniformity of light, density of refractive elements is determined, so that the density is increased as the refractive elements are distant from the light source 210.

Figure 5:
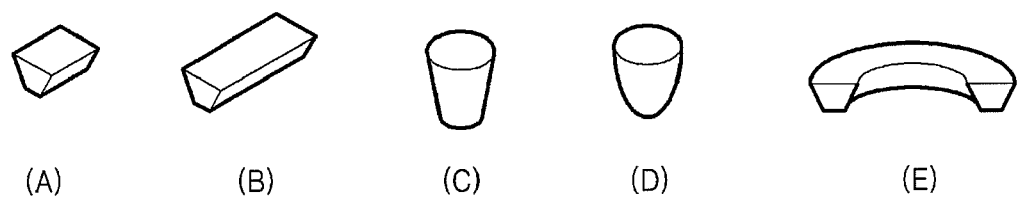
FIGS. 5A to 5E are schematic perspective views illustrating various refractive elements according to another exemplary embodiment of the present invention.

FIG. 5 illustrates a 3D shape of refractive elements to be formed on the all-in-one light guide plate 220. FIG. 5A illustrates a trunk type refractive element having an upper surface (130 of FIG. 1) of which shape is a square. FIG. 5B illustrates a trunk type refractive element having an upper surface of which shape is a rectangle. FIG. 5C illustrates a cylinder type refractive element. FIG. 5D illustrates an oval type refractive element. FIG. 5E illustrates a curved type refractive element. As shown in FIGS. 5A to 5E, sides of the refractive element, that is, surfaces (134 of FIG. 1) from which light is reflected may be planes or curved surfaces. In the present invention, shapes of refractive elements are not limited to those of FIGS. 5A to 5E.

It is efficient to form refractive elements on both sides of an all-in-one light guide plate and gather light that is output to a side of the all-in-one light guide plate to the opposite side by placing a reflective plate at the side. If positions of refractive elements on the side are offset from positions of refractive elements on the opposite side, it is possible to overcome a limit of an interval between neighboring refractive elements and reduce a part that does not contribute to outputting light. Accordingly, it is possible to improve efficiency of using light.

In a case where a light source is located in a side of the all-in-one light guide plate, the reflective plate may be located in the opposite side. In a case where light sources are located in two or more sides, distribution of a light output structure is adjusted suitably for positions of the light sources.

Figure 6:
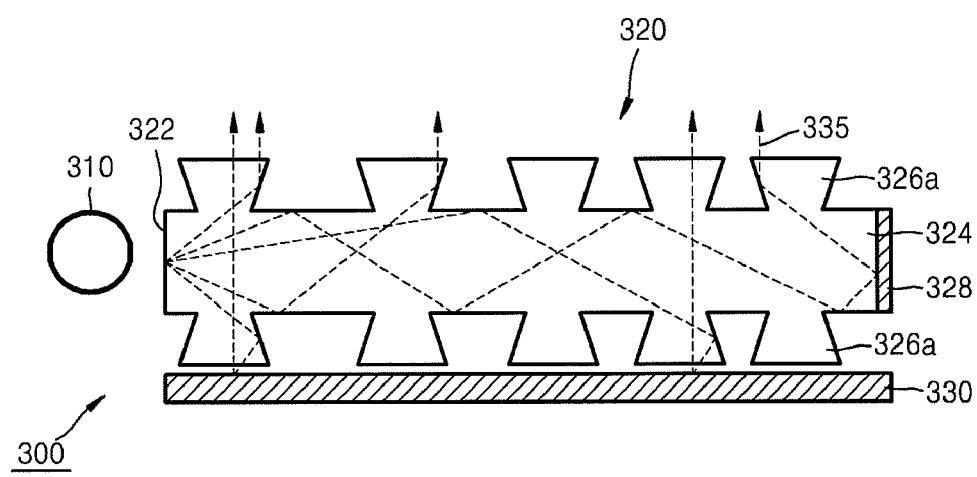
FIG. 6 is a cross-sectional view illustrating a backlight apparatus employing an all-in-one type light guide plate according to another exemplary embodiment of the present invention.

FIG. 6 is a cross-sectional view illustrating a backlight apparatus employing an all-in-one type light guide plate according to another exemplary embodiment of the present invention.

Referring to FIG. 6, a backlight apparatus 300 according to an embodiment of the present invention includes a light source 310 for emitting light and an all-in-one light guide plate 320.

The light source 310 is located in a side 322 of the all-in-one light guide plate 320.

In the all-in-one type light guide plate 320, refractive elements 326a of a light output structure for outputting light to the outside by internally reflecting light that is reflected from a light guide member 324 are integrated into an upper surface of the light guide member 324. Refractive elements 326b are integrated into a lower surface of the light guide member 324. In addition, the refractive elements 326a and 326b of the light output structure are distributed more densely, as the refractive elements become distant from the light source 310.

The backlight apparatus 300 further includes a reflective plate 330 in a side of the all-in-one light guide plate, so that light from the light source 310 is output in a direction (335). Accordingly, the refractive elements 326b formed on the lower surface of the light guide member 324 output light to a lower side by internally reflecting light that is reflected from the light guide member 324. The output light is reflected from the reflective plate 330, transmitted into the all-in-one light guide plate 320, and output to an upper side (335). Thus, the all-in-one light guide plate 320 having refractive elements on both sides has a light output efficiency much greater than that of the all-in-one light guide plate 120 having refractive elements on a side.

On the other hand, in order to prevent a loss of light incident onto the light guide plate 324 and increase a light output efficiency of the all-in-one light guide plate 320, the backlight apparatus 300 further includes a reflective plate 328 on a side opposite to the side onto which light from the light source 310 is incident. Thus, it is possible to reduce a loss of light.

When the light from the light source 310 is incident into the light guide member 324, some of the light is directly output to the outside, after internally reflected by the upper refractive elements 326a. Some of the light is internally reflected from the light guide plate 324, directed toward the reflective plate 328, and reflected from the reflective plate 328, again. Some of a beam reflected from the reflective plate 328 is output through the upper refractive elements 326a. Some of the beam is output through the lower refractive elements 326b. The beam that is output through the lower refractive elements 326b is reincident onto the all-in-one light guide plate 320 by the lower reflective plate 330 and finally output to only a side of the all-in-one light guide plate 320.

On the other hand, since the refractive elements included in the all-in-one light guide plate have a structure with a wide upper width and a narrow lower width, a maximum light output may be limited due to a part that does not contribute to outputting light, because an interval between lower parts of refractive elements is large.

Figure 7:
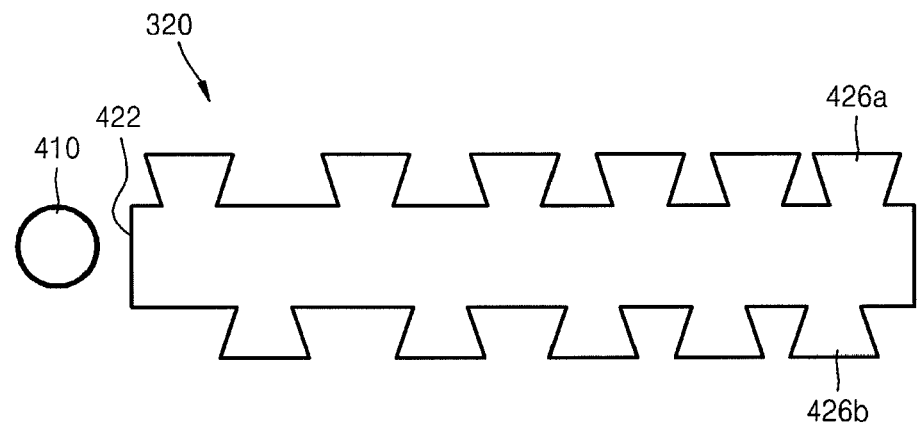
FIG. 7 is a cross-sectional view illustrating a backlight apparatus employing an all-in-one type light guide plate according to another exemplary embodiment of the present invention.

FIG. 7 is a cross-sectional view illustrating a backlight apparatus employing an all-in-one type light guide plate according to another exemplary embodiment of the present invention.

Referring to FIG. 7, a backlight apparatus 400 according to an embodiment of the present invention includes a light source 410 for emitting light and an all-in-one light guide plate 420.

Similar to FIG. 6, the all-in-one light guide plate 420 includes refractive elements on upper and lower surfaces of the light guide member 324. Positions of refractive elements 426a formed on the upper surface are dislocated from positions of refractive elements 426b formed on the lower surface. Accordingly, it is possible to overcome a limit of an interval between refractive elements and reduce a part that does not contribute to outputting light. Thus, it is possible to improve efficiency of using light.

In the embodiment, the backlight apparatus 400 may further include a reflective plate on a lower side of the all-in-one light guide plate 420. In addition, in a case where a light source 410 is located in a side 422 of the all-in-one light guide plate 420, the backlight apparatus 400 may further include a reflective plate on a side opposite to the side 422. On the other hand, in a case where light sources are located on both sides of the all-in-one light guide plate 420, it is possible to manufacture a backlight apparatus with high and uniform brightness by adjusting distribution of refractive elements suitably for positions of the light sources.

The aforementioned all-in-one light guide plate may be made of an elastic material. Polydimethylsiloxane may be used as an example of the elastic material.

The backlight apparatus may be formed by laminating two or more all-in-one light guide plates 120 having refractive elements on a side or laminating two or more all-in-one light guide plates 320 or 420 having refractive elements on both sides.

Figure 8:
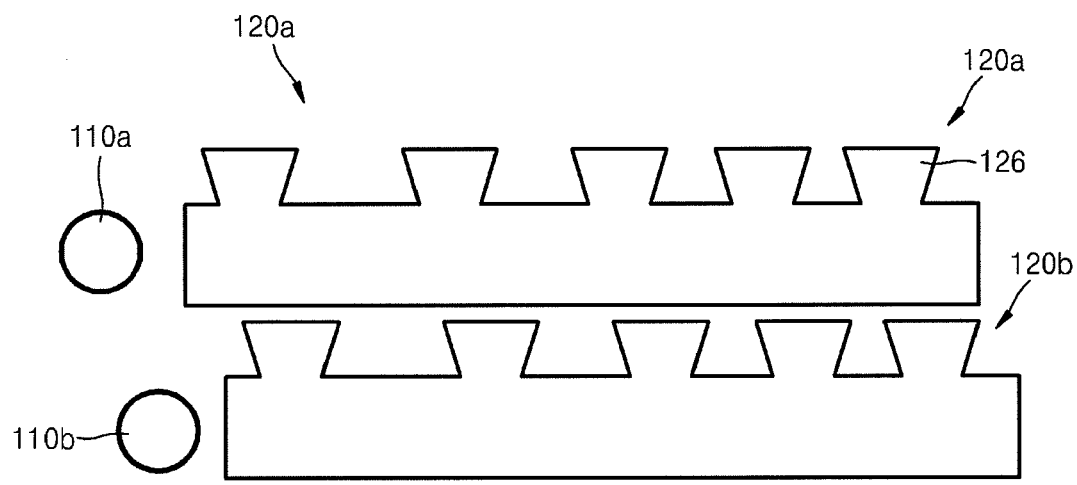
FIG. 8 is a cross-sectional view illustrating a backlight apparatus employing an all-in-one type light guide plate according to another exemplary embodiment of the present invention.

FIG. 8 is a cross-sectional view illustrating a backlight apparatus employing an all-in-one type light guide plate according to another exemplary embodiment of the present invention.

Referring to FIG. 8, a backlight apparatus 500 includes two all-in-one light guide plates 120a and 120b and light sources 110a and 110b for emitting light.

The light sources 110a and 110b are located at a side of the all-in-one light guide plates 120a and 120b.

The all-in-one light guide plates 120a and 120b of the backlight apparatus 500 has a structure in which an upper all-in-one light guide plate 120a is placed on a lower all-in-one light guide plate 120b.

Upper and lower light sources 110a and 110b of the backlight apparatus 500 may be located at opposite positions to each other. At this time, the backlight apparatus 500 has to have uniform and high brightness by adjusting distribution of refractive elements 126 of the all-in-one light guide plates 120a and 120b suitably for positions of the light sources.

In the embodiment, the backlight apparatus 500 may further include a reflective plate on a lower side of the all-in-one light guide plate 120b. In addition, the backlight apparatus 500 may further include a reflective plate on a side opposite to the light sources 110a and 110b.

A backlight apparatus in which refractive elements are formed on both sides of the aforementioned all-in-one light guide plate may be used as a back light of a portable device including a main window and a sub window. In this case, it is possible to design so as to output a desired amount of light to only a desired region. Since only an all-in-one light guide plate is used, it is possible to reduce a thickness of the backlight apparatus and reduce manufacturing costs.

Figure 9:
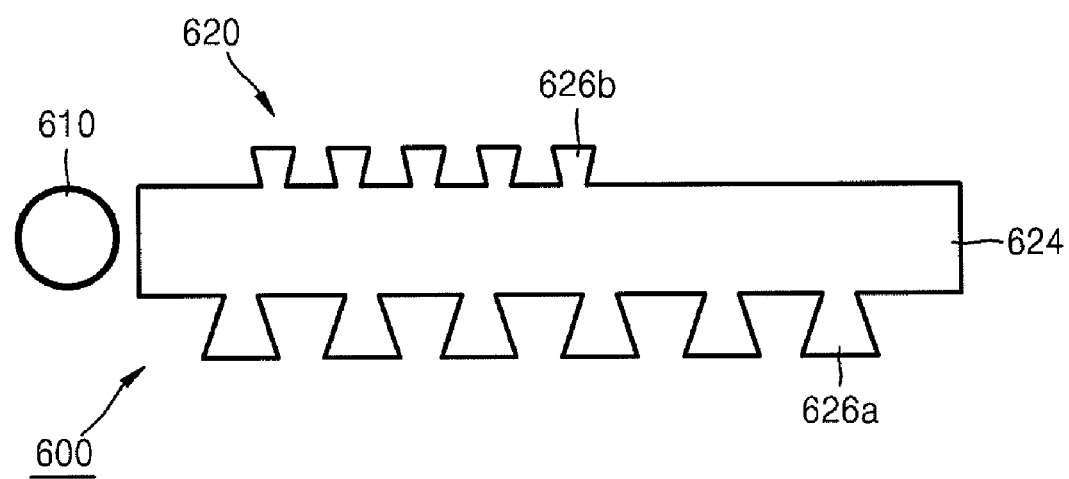
FIG. 9 is a cross-sectional view illustrating a backlight apparatus employing an all-in-one type light guide plate according to another exemplary embodiment of the present invention.

FIG. 9 is a cross-sectional view illustrating a backlight apparatus employing an all-in-one type light guide plate according to another exemplary embodiment of the present invention.

Referring to FIG. 9, a backlight apparatus 600 according to an embodiment of the present invention includes a light source 610 for emitting light and an all-in-one light guide plate 620.

In the all-in-one type light guide plate 620, refractive elements 626a of a light output structure for outputting light to the outside by internally reflecting light that is reflected from a light guide member 624 are integrated into a lower surface of the light guide member 624. Refractive elements 626b are integrated into an upper surface of the light guide member 624. In addition, the refractive elements 626a and 626b of the light output structure are distributed more densely, as the refractive elements become distant from the light source 610.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An all-in-one light guide plate comprising:
a light guide member which receives incident light through an incident light side thereof;
a plurality of refractive elements disposed on a side of the light guide member;
wherein each of the plurality of refractive elements has a first width on a lower side adjacent to the light guide member and a second width on an upper side opposite the lower side, where the first width is less than the second width; and
wherein a density of the plurality of refractive elements increases with distance from the incident light side of the light guide member, and
wherein the light guide member and the plurality of refractive elements are formed as a single, unified element, and there is no optical and physical boundary between the plurality of refractive elements and the light guide member.

2. The all-in-one light guide plate of claim 1, wherein sizes of the plurality of refractive elements increase with distance from the incident light side of the light guide member.

3. The all-in-one light guide plate of claim 1, wherein each of the plurality of refractive elements has a length in a direction parallel to the incident light side which is greater than a length in a direction perpendicular to the incident light side.

4. The all-in-one light guide plate of claim 3, wherein lengths, in a direction parallel to the incident light side, of the plurality of refractive elements increases with distance from the incident light side.

5. The all-in-one light guide plate of claim 1, wherein side surfaces of the plurality of refractive elements are planar.

6. The all-in-one light guide plate of claim 1, wherein side surfaces of the plurality of refractive elements are curved.

7. The all-in-one light guide plate of claim 1, wherein the upper sides of the plurality of refractive elements have the shape of a rectangle, a circle, an oval, a curved shape or a shape obtained by combining two or more of a rectangle, a circle, an oval, and a curved shape.

8. The all-in-one light guide plate of claim 3, wherein the plurality of refractive elements are curved.

9. The all-in-one light guide plate of claim 1, wherein the plurality of refractive elements are disposed on a first side of the light guide member and a second side, opposite the first side.

10. The all-in-one light guide plate of claim 9, wherein refractive elements disposed on the first side are offset from refractive elements disposed on the second side.

11. The all-in-one light guide plate of claim 9, wherein the plurality of refractive elements are dispersed over an entire surface of the first side of the light guide member and are dispersed over a portion less than an entire a surface of the second side.

12. The all-in-one light guide plate of claim 1, wherein the light guide member and the plurality of refractive elements comprise an elastic material.

13. The all-in-one light guide plate of claim 12, wherein the elastic material comprises polydimethylsiloxane.

14. A backlight apparatus comprising:
a light source;
a light guide member which receives incident light, from the light source; and
a plurality of refractive elements disposed on a side of the light guide member;
wherein each of the plurality of refractive element has a first width on a lower side adjacent to the light guide member and a second width on an upper side opposite the lower side, where the first width is less than the second width; and
wherein a density of the plurality of refractive elements increases with distance from the light source, and
wherein the light guide member and the plurality of refractive elements are formed as a single, unified element, and there is no optical and physical boundary between the plurality of refractive elements and the light guide member.

15. The backlight apparatus of claim 14, comprising two or more light guide members which are laminated together.

16. The backlight apparatus of claim 14, wherein the light guide member is a first light guide member and the backlight apparatus further comprises:
a second light guide member, and a plurality of refractive elements disposed on a side of the second light guide member;
wherein the first light guide member is laminated to the second light guide member such that the side of the first light guide member on which the plurality of refractive elements is disposed faces away from the side of the second light guide member on which the plurality of refractive elements are disposed; and
wherein the refractive elements disposed on the first light guide member are offset from the refractive elements disposed on the second light guide member.

17. The backlight apparatus of claim 14, wherein the plurality of refractive elements are disposed on a first side of the light guide member and on a second side of the light guide member opposite the first side.

18. The backlight apparatus of claim 14, further comprising a reflective plate disposed adjacent to a side of the light guide member opposite the incident light side.

19. The backlight apparatus of claim 14, further comprising a reflective plate adjacent to a side of the light guide member opposite the side of the light guide member on which refractive elements are disposed.

20. A backlight apparatus comprising:
first and second light sources;
first and second light guide members, wherein the first light guide member receives light incident from the first light source via a light incident side, and the second light guide member receives light incident from the second light source via a light incident side;
a first plurality of refractive elements disposed on a side of the first light guide member, each having a surface area of a first side adjacent to the first light guide member and a surface area of a second side opposite the first side, where the surface area of the first side is smaller than a surface area of the second side; and
a second plurality of refractive elements disposed on a side of the second light guide member, each having a surface area of a first side adjacent to the second light guide member and a surface area of a second side opposite the first side, where the surface area of the first side is smaller than a surface area of the second side;
wherein a density of the first plurality of refractive elements increases with distance from the first light source and a density of the second plurality of refractive elements increases with distance from the second light source.

* * * * *